3,465,083
  METHOD AND PREPARATIONS FOR THE PRE-
    VENTION AND TREATMENT OF BLOAT IN
    RUMINANTS
Erle E. Bartley and George C. Scott, Manhattan, Kans.;
  said Bartley assignor to Kansas State University Re-
  search Foundation, Manhattan, Kans., a non-profit cor-
  poration, and said Scott assignor to Smith Kline &
  French Laboratories, Philadelphia, Pa., a corporation
  of Pennsylvania
No Drawing. Continuation-in-part of application Ser. No.
  523,543, Jan. 28, 1966. This application July 18, 1967,
  Ser. No. 654,053
         Int. Cl. A61k 27/00; A23k 1/16, 1/18
U.S. Cl. 424—342                                7 Claims

ABSTRACT OF THE DISCLOSURE

Polyoxypropylene-polyoxyethylene polymers of specific polyoxypropylene chain size (mol. wt. 1900–2200) and polyoxyethylene content (25 to 40%) are employed for bloat control in ruminants. The polymers, viz. poloxalene (approx. 2000 mol. wt. polyoxypropylene chain, 33% polyoxyethylene), combine in-rumen effectiveness with oral platability.

Cross reference

This application is a continuation-in-part of our copending Ser. No. 523,543, filed Jan. 28, 1966, and now abandoned.

Background

Bloat is an affliction of ruminant livestock, particularly cattle and sheep, occurring in many parts of the world. Ordinarily, bloat is characterized by an accumulation of gas and foam within the rumen or first compartment of the stomach in sufficient quantity that the normal pressure within the rumen is exceeded and distention of the rumen results. The distention of the rumen can be observed exteriorly as a swelling of the abdomen, particularly on the left side. The extent of the distention increases with the severity of the condition.

As seen in cattle, the first sign of bloat is generally a slight puffiness in the left paralumbar fossa. With increasing severity, the distension of the left paralumbar fossa becomes more marked, and eventually the right side of the animal becomes distended also. The skin becomes tight and drum-like to the touch (the term "tympanites," often used to describe the syndrome, comes from a Greek phrase meaning "drum-like"). The animal becomes restless and may become extremely nervous and excited if disturbed. As internal pressure increases still further, defecation and urination are frequent, incoordination is noted, the anus protrudes, and symptoms of respiratory distress appear. In the terminal stages, there is extreme abdominal distention, severe respiratory distress, cyanosis, prostration and death unless treated.

One factor contributing to the seriousness of the condition is that the amount of time elapsing between the first and last states described above can be as little as ten to fifteen minutes. Under normal conditions on the farm, the husbandman cannot afford a constant watch on a herd of grazing animals, particularly since bloat is often sporadic in nature, not occurring for a considerable time and then striking with no warning. Even when the herd is under constant surveillance, it may be difficult to drive animals that are bloated to a place where they can be restrained and treated in time. Where adequate facilities for treatment are readily available, the tendency of otherwise docile animals to become extremely nervous and unmanageable may still make treatment impossible.

A further complication is the fact that most of the less drastic treatments (from the standpoint of undesirable side effects on the animal) are relatively ineffective in severe cases. In fact, the only relatively sure treatment involves an emergency rumenotomy, which at best requires a period of convalescence and at worst can result in peritonitis and death from secondary causes. Damage resulting from bloat is not confined to death losses (although these are the usual data reported in statistical studies on the subject). Uncertainties involved often cause much inconvenience and concern to the animal owner. Furthermore, there are additional losses due to impaired production of meat and milk in animals afflicted with bloat. Another substantial loss occurs indirectly since farmers often refrain from the use of legumes (which are high yielding and nutritious) because of the risk of bloat.

Bloat as it occurs during the consumption of fresh legumes or the feeding of rations containing a large proportion of ground grains is characterized by the development of a stable foam within the rumen which, if unrelieved, can result in the serious complications mentioned above. In large part, the increase in bloat in recent years has probably been due to an increase in the use of fertilizers, changes in management and feeding practices, and a great increase in the acreage of legumes, alfalfa and ladino clover in particular.

In the past, attempts have been made to prevent bloat through pasture management, grazing control, feeding of dry roughage and the administration of anti-foaming agents or antibiotics. None of these expedients has proven practical.

Some attempts have been made to employ non-ionic surfactants for the prevention and treatment of bloat in ruminants. Among the non-ionic surfactants tested were certain polyoxypropylene-polyoxyethylene polymers (see New Zealand Journal of Agricultural Research, vol. 2, pp. 365–374 (1949); and Australian patent specification No. 23,368/62, corresponding to U.S. Patent No. 3,248,289). Wyandotte Chemicals has sold such surfactants since the early 1950's under the trademark "Pluronic." While a few of the polyoxypropylene-polyoxyethylene polymers were found to have some activity in reducing the incidence or severity of frothy bloat, the overall results with these and other non-ionic surfactants prior to the present invention were discouraging. Despite the great need, no consistently effective prophylactic agent for bloat control was developed. There was no treatment upon which the husbandman could relay.

A serious deterrent to the use of polyoxypropylene-polyoxyethylene polymers for the prevention of bloat is the relative non-palatability of such compounds. Because of the effect of the "palatability factor" in oral administration animals tend to reject preparations containing such polymers.

The rejection of control agents by the animals may depend on odor as well as taste, and can be erratic among the animals of a herd. While prolonged exposure of the animals to feeds containing the control agent can improve acceptance, this is not a satisfactory answer to the problem. The desired objective is to reduce the refusal rate on initial feeding to a minimum, and to assure acceptance of the treated feed by the entire herd within a few days after starting treatment. Continuous administration of the control agent during periods when the animals are not subjected to bloat inducing conditions just to maintain treatment acceptance can be prohibitively expensive. For a given herd it may be desirable to stop the treatment and then start it again after an interval of weeks, such as when the herd is transferred from old pasture to new fresh pasture. This is not feasible where the treating agent gives a palatability problem since effective bloat control is not assured during the critical initial period on the new pasture. Also, the population of a given herd is subject to change. New animals added to a herd receiving the treated feed can be immediately subjected to bloat causing pasture conditions without protection where the treating agent is rejected because of lack of palatability.

Summary

This invention is based on the discovery that a novel molecular weight range of polyoxypropylene-polyoxyethylene polymers provides maximum or greater effectiveness in the prevention and treatment of bloat, while at the same time being more palatable. This is most surprising since other polymers of the same series show a lack of correlation between effectiveness and palatability. The effectiveness of the method and preparations of this invention which utilize the novel polymers is evidenced by the low doses required for producing the same or greater effect, greater rapidity of action as shown particularly in bloat treatment, and the prolongation of bloat control action. The palatability is evidenced by the low percentage of treatment rejection during the first few days of administration. This invention therefore makes possible the formulation of effective bloat control preparations which are palatable, being accepted and eaten by the animals substantially as well as the regular feed for the animals. By virtue of this invention it is possible to effectively prevent bloat in cattle or sheep over an entire feeding or grazing season, and even though the treatment is not continuous, to provide rapid and effective relief for acute bloat which might otherwise result in loss of the animals. It is the combination of maximum effectiveness with maximum palatability which accounts for the great advance in the art achieved by this invention.

Detailed description

The method and preparations of this invention are characterized by the use of a polyoxypropylene-polyoxyethylene polymer consisting essentially of compounds having the general formula:

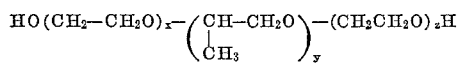

wherein $y$ represents the total number of moles of oxypropylene in the polyoxypropylene chain of the molecule, $x$ and $z$ respectively represent the number of moles of oxyethylene in each of the polyoxyethylene chains of the molecule and are statistically equal, and $x+z$ equals the total moles of oxyethylene. Compounds of this type are block polymers formed from a hydrophobic base polymer of polyoxypropylene glycol which is condensed with ethylene oxide to form end chains of polyoxyethylene. By selecting polyoxypropylene base chains of a particular average molecular weight, and employing a selected molar proportion of ethylene oxide, block polymers may be produced of the desired total molecular weight, containing polyoxypropylene chains of the selected molecular weight, and polyoxyethylene chains averaging a certain percentage of the total weight of the block polymer. The procedure for preparing such compounds is described in detail in U.S. Patent No. 2,674,619, issued Apr. 6, 1954.

The polyoxypropylene-polyoxyethylene polymers suitable for use in the present invention can contain a polyoxypropylene chain having an average molecular weight within the range from 1900 to 2200. Advantageously, the polyoxypropylene base chains have an average molecular weight of from 1950 to 2150. The combined weight of the polyoxyethylene end chains should average from 25 to 40% of the total weight of the block polymer. In the preferred embodiments, the combined weight of the polyoxyethylene chains averages from 29 to 37% of the total weight of the block polymer. The block polymer may have an average molecular weight of 2800 to 3200, and particularly good results have been obtained where the total polymer has an average molecular weight within the range from 2850 to 3150. By way of specific example, the polyoxypropylene-polyoxyethylene polymer having the general formula set out above may have an average total molecular weight of about 3000 and may contain about 67% by weight of polyoxypropylene together with 33% by weight of polyoxyethylene. This polymer, which was developed during the experimental work leading to the present invention, has been assigned the name "poloxalene" (see USAN, January 1966).

Polyoxypropylene - polyoxyethylene polymers formulated as described above are liquids at ordinary temperatures of storage and use, and therefore can be conveniently handled or mixed with particulate carriers, such as various granular feed materials. The polymers have the interesting property of being much more soluble in cold water (e.g., 5° C.) than in warm water (e.g., 40–50° C.). Aqueous solutions of the polymers can therefore be formed in cold water, while after administration to the ruminants, the polymers are exposed to a warm aqueous environment (approximately 40° C.). Under conditions present in the rumen of cattle or sheep, the polymers are relatively insoluble in an aqueous medium. It appears likely that the relative insolubility of the polymers in rumen fluid prolongs the bloat-inhibiting activity of the polymers in the rumen, as evidenced particularly by the carry-over effect. This makes it possible to administer a small dose of the polymer at spaced intervals of time, such as once every 12 or 24 hours, while still maintaining full control and inhibition of bloat, even though the cattle or sheep are being fed a bloat-inducing diet. At the same time, however, rapidity of action is not sacrificed. This makes it possible to use the polymers for immediate relief of acute bloat, as well as for long-term bloat prevention. Heretofore, no single agent has been demonstrated to be consistently effective for both bloat prevention and bloat treatment.

In practicing the present invention, the polyoxypropylene-polyoxyethylene polymer is orally administered to the ruminant. The procedure is effective with both cattle and sheep, the principal domestic ruminants in the United States. For long-term bloat prevention, the polymer may be dispersed in a suitable carrier which is administrable to ruminants, including both solid and liquid carriers. Solid particulate carriers are preferred, since a precisely predetermined quantity of the polymer may be uniformly distributed and absorbed on a solid granular carrier, and the pre-mix thus obtained may be combined with feed materials for the animal in a specific amount to provide a relatively uniform dosage. If desired, the polymer, being a liquid, can be mixed with ruminant feed materials, such as ground corn or cornmeal, ground sorghum meal, wheat bran, oats, soybean flakes, etc. Inert, non-toxic granular carriers may also be used. Because of its inertness and absorbent properties, heat-expanded vermiculite is particularly suitable. Other methods of oral administration can also be used, such as incorporating the polymer in a molasses and/or salt block, or in drinking water for the animals. Where the polymer is to be administered to cattle or sheep being grazed on the open range, the polymer may be combined with a suitable carrier and formed into pellets or cubes for administration to the animals. For bloat treatment, administration by mouth of gelatin capsules containing the polymer or a liquid drench concentrate are particularly desirable. The polymer may be dissolved even more quickly in water by using a suitable mutual solvent, such as a non-toxic alcohol (e.g., ethanol) or propylene glycol.

The minimum effective dose for controlling bloat, either as a long-term bloat preventive or for immediate relief of acute bloat, will vary with the species and size of animal, the diet of the animal, and other factors. However, more than the minimum effective dose can be administered without harmful effect, and therefore an adequate effective dose can be selected on a more or less standardized basis. For example, with cattle up to 1000 pounds body weight, the administration of 10 grams of the polymer during each 24-hour period will effectively prevent bloat. For treatment of bloat, a single dose of 50 grams of the polymer will usually be adequate with cattle. For cattle over 1000 pounds body weight, higher administration levels may be desirable for both bloat treatment and bloat prevention. For example, for cattle of over 1000 pounds body weight, the administration of 20 grams of the polymer per 24 hours will usually fully protect the animals against bloat, but occasionally doses up to 20 grams per 12 hours may be desirable. More generally, as little as 2 to 5 grams of the polymer has value in bloat prevention, but usually the preferred dose for bloat prevention will range from 5 to 40 grams per animal per 24 hours. While larger quantities may be administered, up to 60 grams per animal per 24 hours, there will usually be no improvement in results by exceeding the 40 gram level for cattle, even where the animals have a body weight over 1000 pounds.

For preventing bloat in sheep, as little at .5 to 1 gram of the polymer per animal will be of value, but usually the preferred dosage will range from 1 to 3 grams per animal per 24 hours, although higher doses up to 5 grams per animal per 24 hours can be used. It will be understood that the administration of the polymer to cattle or sheep for bloat control will be repeated and continued on a day-to-day basis over the entire grazing season.

In one convenient administration procedure, the polymer is absorbed on a vermiculite carrier, which is then used as a top dressing for the feed for the animals. Where the animals are fed daily, this provides a convenient means for controlling the amount of the polymer administered. The amount of the top dressing will be selective, so that each animal will receive about 10 to 20 grams of the polymer per 24 hours, the administration being repeated at 24-hour intervals. If desired, the administration of smaller doses at lesser intervals may be used, such as 5 to 15 grams of the polymer each 12 hours.

In the treatment of acute bloat, where prompt and immediate relief is desired, the dose per animal should ordinarily be somewhat greater than the daily dose for bloat prevention. For example, in the treatment of cattle afflicted with bloat, at least one dose of 25 to 50 grams of the polymer will ordinarily be administered. If necessary, the dose can be repeated, but usually a single dose will be sufficient. In extreme cases, the dose might be increased up to 75 or even 100 grams per animal, but ordinarily this will not be necessary, and no increased effect will be obtained at such higher doses. For treatment of bloat in sheep, a dose of from 5 to 15 grams per animal may be used. While higher doses up to 20-25 grams per animal may be administered without disadvantage, ordinarily no greater effect will be obtained. For sheep or cattle afflicted with bloat, administration of the polymer at the dose levels indicated will produce immediate relief. Further, complete and rapid relief may be obtained with a relatively low dose as compared with other non-ionic surfactants.

For effective bloat control in cattle, the 24 hour dose level of the polymer can be proportioned to body weight according to the following schedule.

Body wt. (lbs.):                           Polymer (gms.)
Under 500 _____ 5–10
500–1000 _____ 10–20
1000–1500 _____ 15–30
Over 1500 _____ 20–40

The following examples provide further information about the present invention, and the method and preparations which may be used in practicing the invention.

Example 1

The efficacy of a polyoxypropylene-polyoxyethylene polymer (hereinafter designated POE) for controlling bloat was studied under strictly controlled conditions. This polymer has been given the name "poloxalene" (see USAN, January 1966). The POE polymer of the formula set out in the foregoing specification had an average total molecular weight of approximately 3000, and contained approximately 67% polyoxypropylene together with about 33% polyoxyethylene. The average molecular weight of the polyoxypropylene chain was therefore about 2000, while the combined molecular weights of polyoxyethylene chains was about 1000. The POE polymer was in the form of a syrupy liquid.

In all trials two pairs of fistulated, identical-twin, dry cows were used. They had a history of bloat susceptibility and similar within-twin susceptibility. Rumen fistulas permitted observation of the action of the surface-active agent on rumen foam development.

In Trials I and II, all animals were pastured from 7 A.M. to 11 A.M. and 4 P.M. to 7 P.M. on good-quality alafalfa pasture in the early stage of growth. The surface active agent was introduced into the rumen once daily via the fistula at 6:50 A.M. each day. When removed from pasture, the cows were kept in drylot with only water and salt available.

In Trials III and IV, the animals were fed freshly-cut alfalfa (approximately top 6 in. of succulent alfalfa in early stage of growth) at 7 A.M. and 4 P.M. Treated animals were fed the surfactant in grain containing 10 grams (g.) POE per pound just prior to the morning alfalfa feeding (Table 1).

In Trial I, one member of each twin pair was treated and the other served as control. In Trials II–IV, all animals were treated on alternate days to determine treatment carry-over effects. A three-day pretreatment control period preceded each trial (only one day in Trial IV). Bloat was scored using a 0–5 scale, as follows:

Bloat scale

0=no froth, no abdominal distention
1=slight froth, no abdominal distention
2=definite froth, no abdominal distention
3=definite froth, distention of left side
4=definite froth, distention of left and right side, animal distressed
5=definite froth, severe distention of left and right side and animal in severe distress. Terminal unless relieved.

The results of the tests are set forth below in Table 1.

TABLE 1

| Trial Number | No. of Days | No. of Animals | Treatment [1] | Avg. Bloat Index Morning | Avg. Bloat Index Afternoon | Range in Bloat Scores Morning | Range in Bloat Scores Afternoon |
|---|---|---|---|---|---|---|---|
| I | 2 | 2 | Control | 2.6 | 3.1 | 1.5–3.0 | 2.5–4.0 |
|   | 2 | 2 | 20 g. POE via rumen | 0 | 0.3 | 0 | 0–1.0 |
| II | 3 | 4 | Control (pretreatment) | 2.0 | 1.4 | 0–3.5 | 0–3.5 |
|   | 3 | 4 | 20 g. POE via rumen | [2] 0.1 | [2] 0.1 | 0 | 0–1.0 |
|   | 3 | 4 | Control (posttreatment) | [2] 0.3 | [2] 0.3 | 0–2.0 | 0–2.0 |
| III | 3 | 4 | Control (pretreatment) | 2.2 | 1.5 | 0–3.0 | 0–3.0 |
|   | 3 | 4 | 10 g. POE in grain | [2] 0.3 | [2] 0.5 | 0–1.0 | 0–1.5 |
|   | 3 | 4 | Control (posttreatment) | 2.1 | 2.3 | 0.5–3.5 | 0.5–3.5 |
|   | 2 | 4 | 20 g. POE in grain | [2] 0.4 | [2] 0.4 | 0–1.0 | 0–1.0 |
|   | 2 | 4 | Control (posttreatment) | 2.0 | 1.0 | 0.5–3.0 | 0–3.0 |
| IV | 1 | 4 | Control (pretreatment) | 3.1 | 2.5 | 3.0–3.5 | 2.0–3.0 |
|   | 3 | 4 | 5 g. POE in grain | [2] 0 | [2] 0.6 | 0 | 0.5–1.0 |
|   | 3 | 4 | Control (posttreatment) | 2.0 | 1.7 | 0.5–3.5 | 0–3.0 |

[1] Per 450 kg. body weight.
[2] Significantly different from pretreatment control (P<.01).

In Trial I, 20 g. POE effectively prevented frothy bloat at least 12 hours. During the morning no treated animal scored above zero, indicating that rumen contents were completely devoid of froth. To determine whether one treatment of this compound would be effective for more than 12 hours, Trial II was conducted. Again, 20 g. POE effectively prevented froth the first day, with no treated animal scoring above zero during the morning. Whereas incidence of bloat was slightly higher on the second than, on the first day, bloat the second day (24 to 36 hours following treatment) was significantly lower than during the control period, indicating a significant carry-over effect of one treatment of 20 g. (via rumen fistula).

Trial III was conducted to compare 10 g. with 20 g. POE treatment levels and to determine whether POE was effective when fed mixed with grain. The 10 g. level was equally as effective as the 20 g. level. However, the day following treatment neither level fed in grain was so effective as the 20 g. level introduced into the rumen via the fistula.

Since the 10 g. level was effective during the first 12 hours (Trial III), a 5 g. level was tested in Trial IV. The 5 g. level effectively prevented bloat during the first 12 hours after administration with little, if any, carry-over effect the next day.

Example 2

Four commercial dairy herds (designated A, B, C, and D, Table 2) were used to test the efficacy of the POE polymer of Example 1 to control alfalfa bloat. In Period I, cows in one group were given the bloat preventive; another group served as controls. In Period II, treatments were reversed. Experimental periods varied from 7 to 10 days, based on estimates of quantity of bloat provocative forage available. In Period III, all cows in the herd were treated.

A supplement (A, Table 3) was prepared by absorbing POE on ground sorghum grain and coating the mixture with animal tallow. The supplement for each cow was placed in kraft paper bags in amounts to supply 10 g. POE twice daily for Holsteins and 5 g. for Jerseys. A placebo containing an equivalent quantity of sorghum grain and tallow (supplement B, Table 3) was dispensed in paper bags also. The kraft bags were marked with the cow numbers, and the contents of one bag were poured over the grain fed each cow prior to the morning milking. The procedure was repeated at the afternoon milking. After being milked, the cows were either pastured on alfalfa or fed freshly-cut alfalfa. When a cow bloated severely, she was removed from the pasture and, when necessary, treated by a veterinarian.

A supervisor recorded degree of bloat in all herds twice daily (morning and evening), using the 0–5 scale of Example 1. Milking times were staggered to permit the supervisor to observe all herds during maximum bloat incidence. The results are summarized below in Table 2.

TABLE 2

| Breed | Period | No. of Days | Group | No. of Animals | Treatment | Total Bloat Score A.M. | Total Bloat Score P.M. | Total Bloat Cases A.M. | Total Bloat Cases P.M. |
|---|---|---|---|---|---|---|---|---|---|
| Holstein | I | 9 | I | 21 | Control | 99 | 10 | 47 | 5 |
|  |  | 9 | II | 21 | POE | 0 | 0 | 0 | 0 |
|  | II | 7 | I | 21 | POE | 4 | 2 | 2 | 1 |
|  |  | 7 | II | 21 | Control | 94 | 54 | *42 | 26 |
|  | III | 16 | I | 21 | POE | 0 | 0 | 0 | 0 |
|  |  | 16 | II | 20 | POE | 0 | 0 | 0 | 0 |
| Holstein | I | 10 | I | 14 | Control | 48 | 44 | 22 | 18 |
|  |  | 10 | II | 15 | POE | 6 | 13 | 3 | 6 |
|  | II | 7 | I | 14 | POE | 6 | 14 | 3 | 7 |
|  |  | 7 | II | 15 | Control | 11 | 17 | 5 | 8 |
|  | III | 8 | I | 14 | POE | 0 | 0 | 0 | 0 |
|  |  | 8 | II | 15 | POE | 0 | 0 | 0 | 0 |
| Jersey | I | 8 | I | 8 | Control | 25 | 16 | 12 | 7 |
|  |  | 8 | II | 7 | POE | 0 | 0 | 0 | 0 |
|  | II | 9 | I | 8 | POE | 0 | 0 | 0 | 0 |
|  |  | 9 | II | 7 | Control | 15 | 14 | 7 | 7 |
| Holstein | I | 7 | I | 13 | Control | 29 | 32 | 14 | 16 |
|  |  | 7 | II | 12 | POE | 0 | 0 | 0 | 0 |
|  | II | 7 | I | 13 | POE | 0 | 0 | 0 | 0 |
|  |  | 7 | II | 12 | Control | 0 | 0 | 0 | 0 |

*One cow died from bloat.

The composition of Supplements A and B used in the foregoing experiments is set out below as Table 3:

TABLE 3

| Ingredient | Supplement, Weight Percent A | Supplement, Weight Percent B |
|---|---|---|
| POE | 2.2 | |
| Tallow | 5.0 | 5.1 |
| Ground Sorghum | 92.8 | 94.9 |

Example 3

This experiment differed from that of Example 2 as follows: (a) all cows in the herd received POE for the duration of the experiment; (b) POE was fed as a top dressing or supplement, or was incorporated into the regular herd grain ration; (c) two herds (A and B) were the same ones used in Example 2 but the other two herds (F and E) were new, and (d) herd F was used in two tests at different times.

The supplement used in all tests is set out below in Table 4:

TABLE 4

| Ingredient: | Supplement, weight percent |
|---|---|
| POE | 44.5 |
| Vermiculite | 33.3 |
| Soybean lecithin | 22.2 |

The results of the tests are set out below in Table 5, which also indicates a variation in the method of administering the POE supplement among the different herds:

treatments—control, 1 g. POE daily, 3 g. POE and a salt-molasses block containing 30 g. of POE per pound. The 1

TABLE 5

| Herd | Breed | Method of Administering POE (before milking) | Rate | No. of Animals | Days on Test | Total Bloat Cases |
|---|---|---|---|---|---|---|
| A | Holstein | POE supplement mixed in hard grain ration and fed according to production. | 1 g. POE per 454 g. grain ration. | 42 | 53 | 0 |
| A | do | Same as above | do | 66 | 71 | 0 |
| F | do | Same as above | do | 72 | 52 | a 4 |
| B | do | POE supplement top dressed on herd grain ration. | 10 g. POE per cow per feeding.b | 32 | 43 | 0 |
| E | Jersey | POE mixed with portion of herd ration and pelleted. Fed 454 g. pellets containing 5 g. POE with pelleted herd grain ration. | 5 g. POE per cow per feeding.b | 42 | 29 | 0 | a All cows that bloated received less than 2.5 g. POE per feeding, one of these cows died.
b Two feedings per day.

Example 4

Thirty-six dairy steers, randomly assigned to two groups (treatment and control), were used to evaluate the effectiveness of POE as a bloat preventive in a 113-day trial. Fifteen to 25 cm. Ranger alfalfa tops were harvested twice daily, at 6:30 A.M. and 1:00 P.M., with a flail-type forage harvester and fed to both groups in drylot. (On nine of the first 14 days of the trial, alfalfa was fed in the afternoon only.) The animals were allowed access to alfalfa silage for approximately 4 hours at each feeding.

In addition, the treatment group received sufficient Supplement A (Table 6) once daily to support each animal 10 g. POE. The control group received an equal amount of Supplement B (Table 6). To improve their acceptability, both Supplements A and B were refrigerated 12 hours before being fed. During the last six days of the trial, a POE premix (Supplement C, Table 6) was mixed with Supplement D (Table 6) to provide 10 g. POE per 454 g. of mixture (Supplement E, Table 6), and fed to the treatment group at 454 g. average per head daily. The control group received an equal quantity of Supplement D those 6 days. The supplements were fed in large bunks to the respective groups once daily (before the morning alfalfa feeding).

TABLE 6

| Ingredient | Supplement, Weight Percent | | | | |
|---|---|---|---|---|---|
| | A | B | C | D | E |
| POE | 2.2 | | 40.0 | | |
| Tallow | 5.0 | 5.1 | | | |
| Ground Corn | 92.8 | 94.9 | | 53.9 | |
| Vermiculite | | | 40.0 | | |
| Soybean Lecithin | | | 20.0 | | |
| Ground Oats | | | | 32.4 | |
| Soybean Meal | | | | 10.7 | |
| Salt | | | | 1.0 | |
| Dicalcium Phosphate | | | | 2.0 | |
| Supplement C | | | | | 5.6 |
| Supplement D | | | | | 94.4 |

In this test, POE was found to be effective in controlling legume bloat, with no diminution of effect as the season progressed—a prime requirement of a practical preventive. Four of the only seven bloat cases in the treatment group were credited to one animal. Close observation of that animal indicated that, when it consumed less than half its daily concentrate allowance, it was subject to bloat. The only other severe bloat case in the treatment group was in an animal that refused the POE supplement the day it bloated. There was some variation in the acceptability of the different supplements by the animals, but in general POE presented no serious palatability problem.

Example 5

Sixty native lambs (30 wethers and 30 ewes), having an average weight of 64.4 pounds, were divided into four equal-weight groups of 15 animals each. Ewes and wethers were divided as equally as possible (combinations of 7 and 8). The groups were randomly assigned to four treatments—control, 1 g. POE daily, 3 g. POE and a salt-molasses block containing 30 g. of POE per pound. The 1 g. and 3 g. groups received POE mixed with grain in the form of pellets. The POE concentration was such that 0.25 lb. of pellets would supply the prescribed daily dose per animal. The control group received grain pellets without POE, also at the rate of 0.25 lb. per animal daily. The "block" group received no grain. The grain pellets were fed to the respective groups once daily prior to pasturing or silage feeding. The POE block was available continuously except during five hours each day on 13 days when the lambs were pastured. All 60 lambs were pastured together. However, when silage was fed (38 days), the lambs were maintained within their respective groups at all times.

Much of the time the alfalfa was of poor quality due to poor growing conditions. However, enough bloat did occur late in the trial period to indicate the efficacy of POE in preventing bloat in lambs. Cumulative maximum daily bloat scores were 66 for the control, and 9, 13, and 14 for the 1 g., 3 g. and "block" groups, respectively. The score for the control group was significantly ($P<.01$) greater than for the other groups. Six of the 13 points for the 3 g. group were due to one lamb and corresponded to a period of grain refusal. The "block" group consumed an average of 1.32 lb. of the POE block which provided 2.64 g. of POE per animal daily. The number of grain refusals was not significantly different for the control against the treatment groups, where the POE administrations were well accepted.

Example 6

A series of comparative experiments were conducted to determine the relative effectiveness of various polyoxypropylene-polyoxyethylene polymers of the kind represented by the general formula previously set out herein. The experimental procedure used in these experiments was similar in the following respects. Rumen fistulated identical twin dry cows, steers and heifers were used. These animals had a history of bloat susceptibility and similar within-twin susceptibility. Rumen fistulas permitted observation of the action of the surface active agent on rumen foam development.

All animals were pastured from 7 A.M. to 11 A.M. and 4 P.M. to 7. P.M. on good quality alfalfa pasture in the early stage of growth. When removed from the pasture the animals were kept in drylot with only water and salt available.

The scale used in rating the frothy bloat was as follows:

0=no froth, no abdominal distention
1=slight froth, no abdominal distention
2=definite froth, no abdominal distention
3=definite froth, distention of left side
4=definite froth, distention of left and right side, animal distressed
5=definite froth, severe distention of left and right side and animal in severe distress. Terminal unless relieved.

Severity of bloat usually was greatest between one and two hours after feeding. Maximum bloat was recorded during both morning and afternoon periods. The following is a description of the animals used:

| Animal Numbers | Breed | Weight, lbs. |
|---|---|---|
| 04-05 | Jersey x Shorthorn Steers | 1,056, 1,062 |
| 18-19 | Holstein Heifers | 1,043, 1,034 |
| 20-21 | Holstein Cows | 1,250 |
| 97-98 | Grade Herefords | 850 |

The individual experimental procedures are summarized below for Tests I to VII.

Test I

Three sets of rumen fistulated identical twin cows were used. In a first trial, one member of each pair received all the compounds consecutively while the other member served as a control. Seven polymers were tested. A second trial was similar to the first except that the treatment and control animals within each twin pair were reversed. A third trial was conducted and again the treatments and controls were reversed within each twin pair. The surface active agents were introduced into the rumen once daily via the fistula at 6:50 A.M. at a dosage rate of 45 g. per 1000 lb. body weight. The fistula administration excluded palatability effects. When removed from pasture the cows were kept in drylot with only water and salt available.

Test II

Two sets of identical twins were used. The animals were pastured on succulent alfalfa for eight days. Seven treatments (six compounds plus a control) were alternated among the four animals with a different animal serving as control each day. Therefore, each treatment was tested four times employing a different animal each time. The surface active agents were introduced into the rumen once daily at 6:50 A.M. The dosage rate was 20 g. per 1000 lb. body weight.

Test III

Two sets of rumen fistulated identical twins were used. There were four treatments (control and the three polymers.) The four cows were fed these on eight treatment days arranged as two 4 x 4 Latin squares. The cows were not treated on alternate days, but bloat was scored on both treatment and non-treatment days. The surface active agent was introduced into the rumen once daily at 6:50 A.M. The dosage rate was 20 g. per 1000 lb. body weight.

Test IV

The test preparations used were 40% polymers. Rations were formulated as follows:

Rolled sorghum grain _____ lb __ 36
Lard _____ lb __ 2
Test preparation _____ g __ 1000

(approx.) _____ lb __ 40

Two sets of identical twins were used. One member of each twin pair was fed the mixture containing one test preparation, the other received the mixture containing the second one. The next treatment day the treatments were reversed. A control day was allowed between each treatment day. The amount fed to each animal was 0.5 lb. of grain (approx. 5 g. polymer) immediately prior to the morning feeding of alfalfa. Animals were fed green-chop alfalfa at 7 A.M. and 5 P.M. each day. Morning (A.M.) and afternoon (P.M.) scores were obtained on the day treated.

Test V

The experimental procedure was the same as in Test IV but using one-half the amount of the test compounds. Morning (A.M.) and afternoon (P.M.) scores were obtained on the day treated.

Test VI

The experimental procedure was the same as in Test V. Animals were fed the polymers in grain once daily at the rate of 2.5 g. per 1000 lb. body weight. Morning (A.M.) and afternoon (P.M.) bloat scores were obtained on the day treated.

Test VII

This test was a repeat of Test VI using the same compounds and following the same procedure. Morning (A.M.) and afternoon (P.M.) scores were obtained on the day treated.

The results of Tests I to VII are summarized below the Table 7 where poloxalene is referred to as "Polox." The polymers tested are further identified as follows.

TEST POLYMERS

| Code | Mol. Wt. Polyoxypropylene | Wt. percent Polyoxyethylene |
|---|---|---|
| L42 | 1,200 | 20 |
| L53 | 1,450 | 30 |
| L61 | 1,750 | 10 |
| L62 | 1,750 | 20 |
| L63 | 1,750 | 30 |
| L64 | 1,750 | 40 |
| F68 | 1,750 | 80 |
| L92 | 2,750 | 20 |
| L101 | 3,250 | 10 |
| P105 | 3,250 | 50 |
| F108 | 3,250 | 80 |
| Polox | 2,000 | 33 |

TABLE 7

| Experiment Number | Treatment | Dose/1,000 lb. wt. | Number Animals Control | Number Animals Treated | No. Days | Average Bloat Score a Control | Average Bloat Score a Treated | Percent Efficacy e |
|---|---|---|---|---|---|---|---|---|
| I (P.M.) | L42 | 45 | 3 | 3 | 3 | 2.8 | 0.8 | 71 |
| | L61 | 45 | 3 | 3 | 3 | 2.3 | 1.6 | 30 |
| | L62 | 45 | 3 | 3 | 3 | 2.1 | 0.4 | 81 |
| | L63 | 45 | 3 | 3 | 3 | 2.3 | 0.3 | 87 |
| | L64 | 45 | 3 | 3 | 3 | 1.6 | 0.7 | 56 |
| | L92 | 45 | 3 | 3 | 3 | 2.6 | 0.9 | 65 |
| | L101 | 45 | 3 | 3 | 3 | 2.7 | 2.1 | 22 |
| II (P.M.) | F108 | 20 | 4 | 4 | 2 | 2.7 | 2.12 | 21 |
| | P105 | 20 | 4 | 4 | 2 | 2.7 | 1.37 | 49 |
| | L63 | 20 | 4 | 4 | 2 | 2.7 | 0 | 100 |
| | Polox | 20 | 4 | 4 | 2 | 2.7 | 0.25 | 91 |
| | L53 | 20 | 4 | 4 | 2 | 2.7 | 0.4 | 85 |
| | F68 | 20 | 4 | 4 | 2 | 2.7 | 2.5 | 7 |
| III (P.M.) | L53 | 20 | 4 | 4 | 16 | 0.94 | 0 | 100 |
| | Polox | 20 | 4 | 4 | 16 | 0.94 | 0 | 100 |
| | L63 | 20 | 4 | 4 | 16 | 0.94 | 0.13 | 86 |
| IV (A.M.) | L53 | 5 in grain | 4 | 4 | 5 | 3.1 | 0.25 | 92 |
| | Polox | do | 4 | 4 | 5 | 3.1 | 0 | 100 |
| IV (P.M.) | L53 | do | 4 | 4 | 5 | 2.5 | 0.6 | 76 |
| | Polox | do | 4 | 4 | 5 | 2.5 | 0.6 | 76 |

TABLE 7.—Continued

| Experiment Number | Treatment | Dose/1,000 lb. wt. | Number Animals Control | Number Animals Treated | No. Days | Average Bloat Score [a] Control | Average Bloat Score [a] Treated | Percent Efficacy [6] |
|---|---|---|---|---|---|---|---|---|
| V (A.M.) | L53 | 2.5 in grain | 4 | 4 | 5 | 3.0 | 0.13 | 96 |
|  | Polox | do | 4 | 4 | 5 | 3.0 | 0.13 | 96 |
| V (P.M.) | L53 | do | 4 | 4 | 5 | 2.9 | 1.25 | 57 |
|  | Polox | do | 4 | 4 | 5 | 2.9 | 0.75 | 74 |
| VI (A.M.) | L62 | do | 4 | 4 | 8 | 3.2 | 0.6 | 81 |
|  | L53 | do | 4 | 4 | 8 | 3.2 | 0.5 | 84 |
|  | Polox | do | 4 | 4 | 8 | 3.2 | 0.25 | 92 |
| VI (P.M.) | L62 | do | 4 | 4 | 8 | 3.4 | 1.6 | 53 |
|  | L53 | do | 4 | 4 | 8 | 3.4 | 1.3 | 62 |
|  | Polox | do | 4 | 4 | 8 | 3.4 | 0.5 | 85 |
| VII (A.M.) | L62 | do | 4 | 4 | 8 | 3.3 | 1.3 | 61 |
|  | L53 | do | 4 | 4 | 8 | 3.3 | 0.8 | 76 |
|  | Polox | do | 4 | 4 | 8 | 3.3 | 0.5 | 85 |
| VII (P.M.) | L62 | do | 4 | 4 | 8 | 3.1 | 1.8 | 42 |
|  | L53 | do | 4 | 4 | 8 | 3.1 | 1.1 | 65 |
|  | Polox | do | 4 | 4 | 8 | 3.1 | 0.5 | 84 |

[a] 0=no bloat, 5=severe bloat, etc., per above scale.
[6] Control score−treated score/control score×100.

The data of Table 7 shows that poloxalene was the most effective polymer tested. The procedure of using fistulated twins gives the data a high degree of reliability.

Example 7

A series of palatability trials comparing various polyoxypropylene-polyoxyethylene polymers as identified in Example 6 were conducted using regular herds of non-fistulated cows. All polymers were absorbed on vermiculite (1:1 w./w.) and top dressed on grain to furnish 10 g. of polymer. Each day the cows were assigned to six groups with 20 cows per group. Each day different cows were assigned to different groups. Each trial was conducted for six or seven days. Grain top-dressed with the polymer was offered to each cow separately when she was placed in her stall in the milking barn prior to being milked. After 10 minutes the intake of each animal was rated as part, all, or none consumed. The results are summarized in Tables 8 to 10, where the code identifications of Example 6 are used.

TABLE 8

Percent of Absolute Refusal

| Day | L62 | L63 | L64 | L42 | L53 | Polox |
|---|---|---|---|---|---|---|
| 1 | 74 | 83 | 89 | 69 | 71 | 66 |
| 2 | 70 | 59 | 81 | 71 | 77 | 45 |
| 3 | 58 | 64 | 63 | 54 | 69 | 29 |
| 4 | 63 | 53 | 67 | 48 | 43 | 20 |
| 5 | 47 | 49 | 38 | 47 | 45 | 17 |
| 6 | 33 | 31 | 34 | 31 | 28 | 9 |
| 7 | 33 | 30 | 29 | 29 | 17 | 8 |

TABLE 9

Percent of Absolute Refusal

| Day | L61 | L62 | L92 | L101 | Polox |
|---|---|---|---|---|---|
| 1 | 87 | 80 | 63 | 61 | 59 |
| 2 | 71 | 74 | 50 | 43 | 38 |
| 3 | 62 | 50 | 47 | 41 | 33 |
| 4 | 61 | 47 | 39 | 32 | 32 |
| 5 | 44 | 45 | 38 | 10 | 18 |
| 6 | 41 | 38 | 30 | 9 | 15 |

TABLE 10

Percent of Absolute Refusal

| Day | L53 | L62 | L92 | L101 | Polox |
|---|---|---|---|---|---|
| 1 | 74 | 72 | 58 | 56 | 54 |
| 2 | 72 | 63 | 38 | 46 | 39 |
| 3 | 59 | 48 | 34 | 23 | 26 |
| 4 | 51 | 40 | 31 | 17 | 34 |
| 5 | 29 | 14 | 28 | 12 | 7 |
| 6 | 13 | 7 | 20 | 3 | 6 |

The data of Tables 8 to 10 shows that poloxalene was of equal or greater palatability than any other polymer tested. When this data is compared with that of Table 7 the complete lack of correlation between the in rumen effectiveness and palatability is evident. Test compound 101, for example, ranked so low in effectiveness as to be no value for bloat control, yet this was the only polymer which approached poloxalene in palatability. On the other hand, the polymers which exhibited greater effectiveness (other than poloxalene) are shown to be less palatable on the average than poloxalene. The evidence therefore indicates that poloxalene possesses a unique combination of bloat controlling and oral palatability properties.

Example 8

Specific preferred formulations for practicing the present invention include a top dressing, a molasses block, and a drench concentrate, which may be prepared as set out below:

TOP DRESSING

| Ingredient: | Weight percent |
|---|---|
| Poloxalene | 53 |
| Vermiculite | 47 |

MOLASSES BLOCK

| Ingredient: | Weight percent |
|---|---|
| Dried can molasses | 44.54 |
| Ground soybean hulls | 24.90 |
| Poloxalene | 6.55 |
| Granulated salt | 20.04 |
| Trace minerals and vitamins | 0.20 |
| Stabilized animal fat | 1.11 |
| Moisture | 2.66 |

DRENCH CONCENTRATE

| Ingredient: | Percent weight volume |
|---|---|
| Poloxalene | 83.333 |
| Butylated hydroxytoluene | 0.050 |
| Methylparaben | 0.125 |
| Propylparaben | 0.025 |
| Ethanol USP (q.s.) (or propylene glycol) | 100.000 |

If the top dressing is to be stored for extended periods of time, especially at elevated temperatures, it is desired to include an anti-oxidant to inhibit the oxidation of the poloxalene. For example, the poloxalene can contain 0.03% Ethoxyquin. Instead of vermiculite, other carriers can be used such as ground sorghum grain and ground shelled corn. The molasses block may be formed in various sizes, such as 33.3 pound blocks. In the formulation set out, each pound of the block will contain 30 grams of poloxalene. The drench concentrate may contain either ethanol or propylene glycol as a solubilizing aid, and also preferably includes an anti-oxidant and one or more preservatives.

The top dressing in granular form may be either mixed or spread on the top of rations thereof for animals fed in barns or from feed troughs. For cattle under 1000 pounds body weight, the recommended dose is ¼ cup (⅔ oz.) of the top dressing daily (24 hours), which approximates 10 g. of poloxalene per animal. For cattle over 1000 pounds, the recommended dose is ½ cup (1½ oz.) of the top dressing daily, which approximates 20 g. of poloxalene per 24 hours.

The molasses-salt block is designed for use with cattle on pastures ab libitum for continuous grazing, the salt being used to control consumption of the block. As formulated, it is intended that each animal should consume about ½ lb. of the block per day. Since the block contains 30 g. of poloxalene per pound, this consumption rate approximates a daily dose (24 hours) of 15 g. of poloxalene per animal. The molasses can be omitted and the poloxalene incorporated in a salt block or mixed with ground salt.

The drench concentrate contains 50 g. of poloxalene per 60 ml. (2 fl. oz.). It may therefore be packaged in a form for convenience of dispensing and using a 60 ml. dose, which would contain 50 g. of poloxalene. The dose of the concentrate may be dissolved in one to four pints of water prior to administration to the animal, such as by the use of a drench tube.

The polymer, such as poloxalene, for use in the above formulations may have the following specifications:

| | |
|---|---|
| Total molecular weight | 2850–3150 |
| Molecules weight base polymer | 1950–2150 |
| Hydroxyl number | 34.4–35.0 |
| pH (2.5% soln.) at 25° C. | 5.0–7.5 |
| Viscosity, cps., at 25° C. | 450–600 |
| Cloud point (10% soln.), ° C. | 40–45 |

It has been found that the method and preparations of this invention are safe, reliable, and effective for controlling frothy bloat, being useful both in bloat prevention and in bloat treatment. The method and preparations do not adversely affect normal rumen function. When administered to dairy cows, there appears to be no significant effect on milk flavor. No detectable poloxalene residue is found in the milk of cows given the poloxalene as a top dressing at levels of 10–20 grams for 15 days. In tissue residue studies, no detectable levels of poloxalene were found in the liver, kidneys or muscle of cattle 24 hours after termination of the last poloxalene administration. The method and preparations of this invention therefore provide a highly effective and practical agent for the prophylaxis and therapy of frothy or legume bloat in cattle. By the use of the bloat prevention method of this invention, it will be possible for cattle and sheep grazers to make more productive use of legume pasture (alfalfa, clover, etc.), whereas this has not been previously possible because no consistently effective prophylactic agent for bloat has been available. Although incidents of pasture bloat have generally been considered as peaking at early spring and again in late summer to early fall, animals may bloat at any time during the pasture season. Occurrences are unpredictable from year to year and from one geographical area to the next, since they are dependent upon climatic conditions, pasture conditions, and various management practices. Consequently, to avoid bloat, many farmers restrict or avoid grazing their livestock on lush, productive legume pastures, and use less productive grasses instead.

We claim:

1. The method of controlling pasture bloat in ruminants comprising orally administering to said ruminants a bloat controlling effective amount of a polyoxypropylene-polyoxyethylene polymer consisting essentially of compounds having the formula

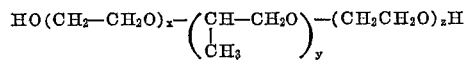

wherein $y$ represents the total number of moles of oxypropylene in the polyoxypropylene chain of the molecule, $x$ and $z$ respectively represent the number of moles of oxyethylene in each of the polyoxyethylene chains of the molecule and are statistically equal, and $x+z$ equals the total moles of oxyethylene in both of the polyoxyethylene chains, said polymer having an average total molecular weight of substantially 2850 to 3150, and being characterized by containing about 33% by weight of said polyoxyethylene together with about 67% by weight of said polyoxypropylene.

2. The method of claim 1 wherein said ruminants are cattle susceptible to pasture bloat, and said polymer is fed to said cattle for prevention of bloat in admixture with a cattle edible carrier at a rate of about 5 to 40 grams of said polymer per animal per 24 hours for a plurality of 24-hour periods.

3. The method of claim 1 wherein said ruminants are sheep susceptible to pasture bloat, and said polymer is fed to said sheep for prevention of bloat in admixture with a sheep edible carrier at a rate of about 1 to 3 grams of said polymer per animal per 24 hours for a plurality of 24-hour periods.

4. A preparation for controlling pasture bloat in ruminants, comprising a ruminant edible carrier having dispersed therein a bloat controlling effective concentration of a polyoxypropylene-polyoxyethylene polymer consisting essentially of compounds having the formula

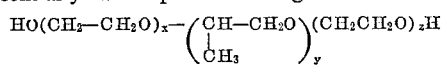

wherein $y$ represents the total number of moles of oxypropylene in the polyoxypropylene chain of the molecule, $x$ and $z$ respectively represent the number of moles of oxyethylene in each of the polyoxyethylene chains of the molecule and are statistically equal, and $x+z$ equals the total moles of oxyethylene in both of the polyoxyethylene chains, said polymer having an average total molecular weight of substantially 2850 to 3150, and being characterized by containing about 33% by weight of said polyoxyethylene together with about 67% by weight of said polyoxypropylene.

5. The preparation of claim 4 wherein said carrier consists essentially of vermiculite and said polymer is absorbed thereby.

6. The preparation of claim 4 wherein said carrier is in the form of a molasses-salt block.

7. The preparation of claim 4 wherein said carrier and said polymer comprise a top dressing in granular form.

References Cited

UNITED STATES PATENTS

| | | | |
|---|---|---|---|
| 3,074,846 | 1/1963 | Nichols | 167—53 |
| 3,119,738 | 1/1964 | Nichols | 167—53 |
| 3,248,289 | 4/1966 | Shinozaki | 167—53 |

OTHER REFERENCES

Oxford, A. E., New Zealand Journal of Agricultural Research, vol. 2, pp. 365–374 (1959).

Reid C. S. W. et al., New Zealand Journal of Agricultural Research, vol. 4, pp. 476–483 (1962).

ALBERT T. MEYERS, Primary Examiner

J. V. COSTIGAN, Assistant Examiner